(12) United States Patent
Tsuzuki (10) Patent No.: US 9,544,505 B2
(45) Date of Patent: Jan. 10, 2017

(54) IMAGE PROCESSING APPARATUS FOR SYNTHESIZING IMAGES BASED ON A PLURALITY OF EXPOSURE TIME PERIODS AND IMAGE PROCESSING METHOD THEREOF

(71) Applicant: HANWHA TECHWIN CO., LTD., Changwon-si (KR)

(72) Inventor: Takeru Tsuzuki, Changwon (KR)

(73) Assignee: Hanwha Techwin Co., Ltd., Chanwon-si (KR)

( * ) Notice: Subject to any disclaimer, the term of this patent is extended or adjusted under 35 U.S.C. 154(b) by 0 days.

(21) Appl. No.: 14/640,191

(22) Filed: Mar. 6, 2015

(65) Prior Publication Data

US 2015/0296116 A1 Oct. 15, 2015

(30) Foreign Application Priority Data

Apr. 11, 2014 (JP) ............................... 2014-0081999
Sep. 25, 2014 (KR) ........................ 10-2014-0128283

(51) Int. Cl.
*H04N 5/235* (2006.01)
*H04N 5/232* (2006.01)

(52) U.S. Cl.
CPC ........ *H04N 5/2355* (2013.01); *H04N 5/23254* (2013.01); *H04N 5/23277* (2013.01)

(58) Field of Classification Search
CPC .............. H04N 5/2355; H04N 5/23254; H04N 5/23277

USPC ....................................................... 348/222.1
See application file for complete search history.

(56) References Cited

U.S. PATENT DOCUMENTS

| 7,609,320 | B2 | 10/2009 | Okamura | |
|---|---|---|---|---|
| 2011/0292243 | A1* | 12/2011 | Nagataki | H04N 5/2353 348/229.1 |
| 2014/0153839 | A1 | 6/2014 | Tsuzuki | |
| 2014/0198226 | A1* | 7/2014 | Lee | H04N 5/2355 348/208.1 |

FOREIGN PATENT DOCUMENTS

| JP | 2014110621 | * | 6/2014 | ............. H04N 5/235 |
|---|---|---|---|---|
| JP | 2014110621 | A | 6/2014 | |
| KR | 1020090048191 | A | 5/2009 | |
| KR | 100968983 | B1 | 7/2010 | |

* cited by examiner

*Primary Examiner* — Nhan T Tran
*Assistant Examiner* — Chan Nguyen
(74) *Attorney, Agent, or Firm* — Sughrue Mion, PLLC (57) ABSTRACT

An image processing apparatus includes: a use-image selector configured to generate use-image selection information for selecting one image, from a plurality of images of a subject which are captured for a plurality of exposure time periods, to be used for each region of a synthesized image; an average processor configured to acquire averaged use-image selection information by averaging previous use-image selection information and current use-image selection information; and a synthesizer configured to generate the synthesized image by synthesizing at least two images, among the plurality of images, to constitute the each region according to the averaged use-image selection information.

20 Claims, 6 Drawing Sheets

IMAGE PROCESSING APPARATUS FOR SYNTHESIZING IMAGES BASED ON A PLURALITY OF EXPOSURE TIME PERIODS AND IMAGE PROCESSING METHOD THEREOF

CROSS-REFERENCE TO RELATED APPLICATIONS

This application claims priority from Japanese Patent Application No. 2014-0081999, filed on Apr. 11, 2014, in the Japanese Patent Office and Korean Patent Application No. 10-2014-0128283, filed on Sep. 25, 2014, in the Korean Intellectual Property Office, the disclosures of which are incorporated herein in their entirety by reference.

BACKGROUND

1. Field

Apparatuses and methods consistent with exemplary embodiments relate to image processing capable of performing an improved wide dynamic range (WDR) or high dynamic range (HDR) photographing functions.

2. Description of the Related Art

The use of a wide dynamic range (WDR) or high dynamic range (HDR) photographing function has recently increased. According to the WDR or HDR photographing function, a short-time exposure image (hereinafter, referred to as "short-exposure image") and a long-time exposure image (hereinafter, referred to as "long-exposure image") are continuously captured, and then, synthesized Thus, it is possible to obtain an image of a dynamic range beyond a maximum dynamic range that an image sensor is allowed to provide. The WDR or HDR photographing function is significantly effective for a high-contrast-ratio scene such as a backlight mode.

Criteria for selecting an image between a long-exposure image and a short-exposure image to be used for each pixel of a region usually include pixel value information and motion detection information. In a continuous image group, it is common that a pair of a short-exposure image and a long-exposure image are synthesized.

A scene, in which a camera slightly shakes, will be described. For example, a case where a fixed camera installed outdoors is slightly shaken by passing vehicles (or by wind), or a case where a portable camera is slightly shaken by a user's hand shake will be described. In such a scene, for a specific region of a WDR-synthesized image, selection of a short-exposure image and a long-exposure image is changed with respect to time. Thus, a difference of image quality between the short-exposure image and the long-exposure image may be seen as flicker.

A difference of image quality between the short-exposure image and the long-exposure image will be described. Generally, synthesizing WDR images is performed after a short-exposure image is normalized by an exposure ratio so that the short-exposure image has the same brightness as a long-exposure image. In a region in which a long-exposure image is saturated, it is impossible to make the short-exposure image and the long-exposure image have the same brightness. However, if the long-exposure image is not saturated, the brightness of the long-exposure image may match with the brightness of the normalized short-exposure image. However, it is difficult to make the two images have exactly the same image quality.

For example, if the normalization is performed based on the exposure ratio, an intended exposure ratio may not be equal to a ratio of an actually captured pixel value. This is because a setting accuracy of a shutter time is low or an exposure characteristic of an image sensor is affected. When the normalization of the short-exposure image is performed, a computational accuracy may also become a problem.

The short-exposure image generally has a lot of noise. Thus, even though the brightness matches, a difference in the amount of noise may be detected as flicker if the short-exposure image and the long-exposure image obtained by capturing the same subject are frequently changed.

The Patent Literatures below disclose technologies for reducing influence of external vibration on the WDR-synthesized image.

Japanese Patent Laid-Open Publication No. 2003-143484 (hereinafter, referred to as Patent Literature 1) discloses a technology that synthesizes images after absorbing misalignment of an entire screen by coordinate transformation. Even when a position of the short-exposure image is misaligned with a position of the long-exposure image due to vibration such as a camera shake, it is possible to synthesize the images regardless of such misalignment.

Japanese Patent Laid-Open Publication No. 2012-165213 (hereinafter, referred to as Patent Literature 2) discloses an algorithm in which, when determining which one of a short-exposure image and a long-exposure image is to be used, if a pixel value thereof is equal to or greater than a threshold value with reference to a long-exposure image, the short-exposure image is used.

Since the long-exposure image is saturated, the image selection is smoothly transitioned to generate a natural synthesized image in a high contrast region in which a region that uses the short-exposure image is adjacent to a region that is appropriately exposed and uses the long-exposure image. However, since a pixel value of the saturated long-exposure image is mixed, a color is lightened in a saturated portion of the high contrast region. Thus, the technology of Patent Literature 2 generates an image by enlarging a bright pixel value region of the long-exposure image by as much as a vibration amplitude, determines a selection signal with reference to the enlarged image, and enlarges a region using the short-exposure image.

Japanese Patent Laid-Open Publication No. 2011-135152 (hereinafter, referred to as Patent Literature 3) discloses a technology that performs bracket capturing with a short shutter time so as to maximally suppress a misalignment due to a vibration.

Japanese Patent Laid-Open Publication No. 2013-066142 (hereinafter, referred to as Patent Literature 4) discloses a technology that suppresses a synthesis artifact or a shaken image by using a short-exposure image in a motion region. In this technology, when a shaken long-exposure image is captured by movement of a subject, a short-exposure image having a small amount of shake components is used.

Using the technology described in Patent Literature 1 may be effective while observing one frame of WDR-synthesized image. However, when continuously observing WDR-synthesized images, the influence of vibration may not be disregarded. For example, when a position of the short-exposure image is shifted for alignment with reference to the long-exposure image, if the long-exposure image is influenced by the vibration, the influence of the vibration also remains in the synthesized image group. That is, according to the technology described in Patent Literature 1, selection of the short-exposure image and the long-exposure image is changed with respect to time by the vibration, and a part of the image may be seen as flicker.

In the technology described in Patent Literature 2, the saturated long-exposure image is not used for synthesis.

Therefore, it may be possible to address generation of an unnatural color caused when a pixel value of the saturated long-exposure image is used for the synthesis. However, according to this technology, the position of a transition region of the short-exposure image and the long-exposure image is merely spatially moved. Therefore, for a specific region among temporally continuous WDR-synthesized images, the short-exposure image and the long-exposure image may be frequently changed by vibration.

According to the technology described in Patent Literature 3, influence of fast vibration may not be disregarded. In addition, even though it is assumed that the influence of vibration can be disregarded, noise caused by a short shutter time may be increased.

The technology described in Patent Literature 4 does not describe flicker that is included in a continuous WDR synthesis result when vibration exists. However, when entire vibration is detected as a motion, the short-exposure image is selected in a full screen and noise increases on the full screen. In addition, when vibration is not detected as a motion, an image to be used for the synthesis is selected from the short-exposure image and the long-exposure region according to a pixel value. Since the image used for the synthesis is temporally changed, flicker may appear.

SUMMARY

Exemplary embodiments include image processing apparatuses and image processing methods in which when a short-exposure image and a long-exposure image are selected so as to be used for synthesis, it is possible to suppress the selected images from being changed by slight vibration.

Various aspects will be set forth in part in the description which follows and, in part, will be apparent from the description, or may be learned by practice of the presented embodiments.

According to an exemplary embodiment, there is provided an image processing apparatus which may include: a use-image selector configured to generate use-image selection information for selecting one image, from a plurality of images of a subject which are captured for a plurality of exposure time periods, to be used for each region of a synthesized image; an average processor configured to acquire averaged use-image selection information by averaging previous use-image selection information and current use-image selection information; and a synthesizer configured to generate the synthesized image by synthesizing at least two images, among the plurality of images, to constitute the each region according to the averaged use-image selection information.

The image processing apparatus may further include: a motion detector configured to detect motion information about the subject; and an update processor configured to update the averaged use-image selection information according to the motion detection information, wherein the synthesizer is configured to generate the synthesized image by synthesizing the at least two images according to the updated use-image selection information.

Here, the motion detector may detect the motion information using the at least two images or only one image selected from the at least two images.

The image processing apparatus may further include a reduction processor configured to obtain reduced images by respectively reducing the plurality of images, and the use-image selector may generate the use-image selection information according to the reduced images.

The use-image selector may be configured to generate the use-image selection information according to the reduced images.

The motion detector may be configured to detect the motion information from the reduced images.

The update processor may be configured to update the averaged use-image selection information so that an image, which is captured for the shortest exposure time period among the plurality of images, is used in a motion region, corresponding to the motion information, of the synthesized image.

In the above, the previous use-image selection information may include mixture ratio of at least two previous images for each region in a previously generated synthesized image, and the current use-image selection information may include a mixture ratio of the at least two images for the each region in the currently synthesized image.

According to another exemplary embodiment, there is provided an image processing method which may include: generating use-image selection information for selecting one image, from a plurality of images of a subject which are captured for a plurality of exposure time periods, to be used for each region of a synthesized image; acquiring averaged use-image selection information by averaging previous use-image selection information and current use-image selection information; and generating a synthesized image by synthesizing at least two images, among the plurality of images, to constitute the each region according to the averaged use-image selection information.

The method may further include detecting motion information about the subject; and updating the averaged use-image selection information according to the motion detection information, wherein the synthesized image is generated by synthesizing the at least two images according to the updated use-image selection information.

Here, the motion information may be detected using the at least two images or only one image selected from the at least two images.

The above method may further include obtaining reduced images by respectively reducing the plurality of images, wherein the use-image selection information is generated according to the reduced images.

In the above, the reducing the plurality of images may be performed by dividing each of the plurality of images into plurality of predetermined-size blocks and averaging pixel values of each of the blocks.

The averaged use-image selection information may be updated such that an image, which is captured for the shortest exposure time period among the plurality of images, is used in a motion region, corresponding to the motion information, of the synthesized image.

As described above, when the at least two images among the plurality of images are selected for use in the synthesis, it is possible to prevent the selected images from being frequently changed due to slight vibration.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION OF THE EXEMPLARY EMBODIMENTS

Reference will now be made in detail to exemplary embodiments, which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the inventive concept.

First Embodiment

First, a configuration and operation of an image processing apparatus according to a first exemplary embodiment will be described below.

Figure 1:
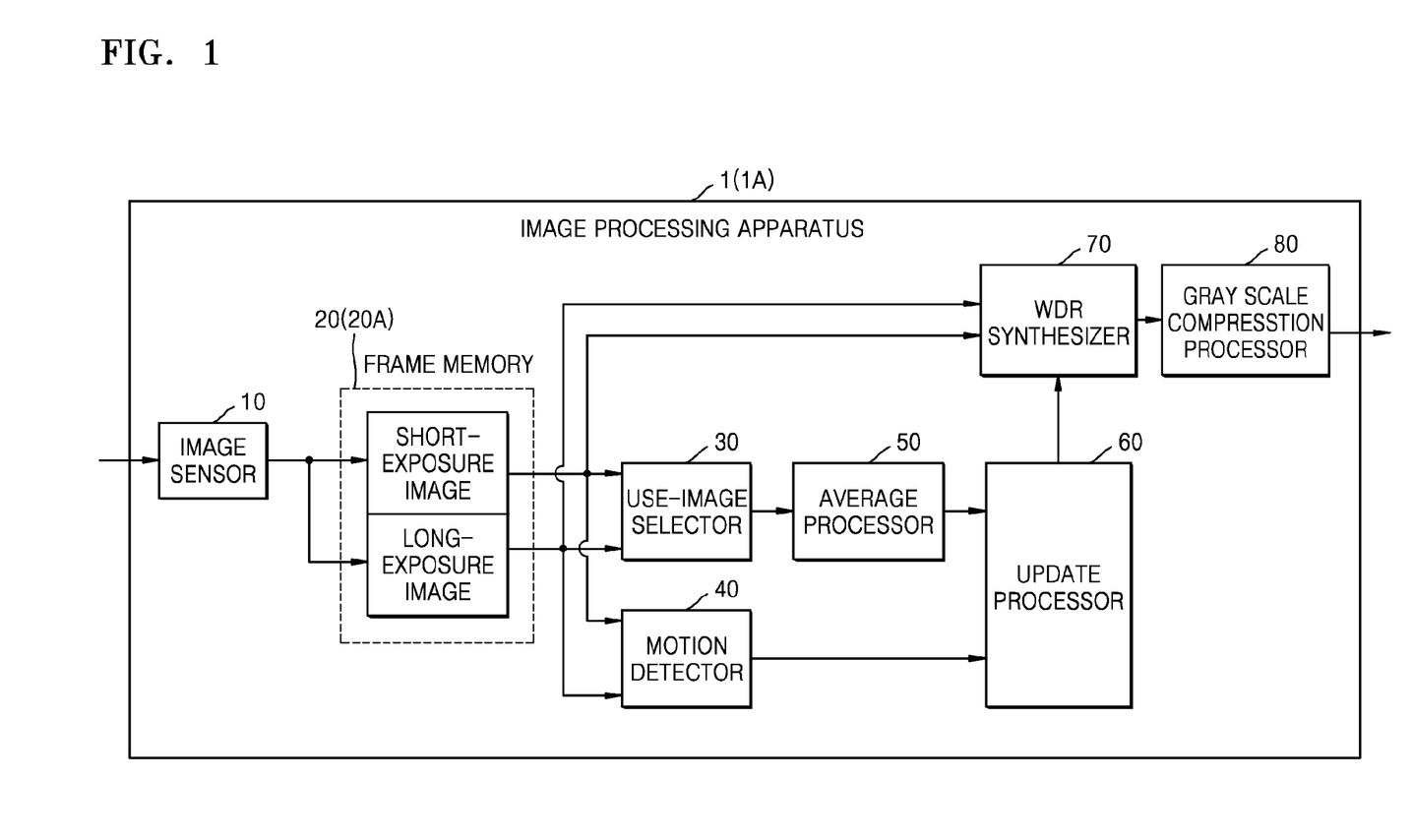
FIG. 1 is a diagram illustrating a configuration and operation of an image processing apparatus, according to a first exemplary embodiment.

FIG. 1 is a diagram illustrating a configuration and operation of an image processing apparatus 1A according to the first exemplary embodiment. As illustrated in FIG. 1, the image processing apparatus 1A includes an image sensor 10, a frame memory 20A, a use-image selector 30, a motion detector 40, an average processor 50, an update processor 60, a WDR synthesizer 70, and a gray scale compression processor 80. Hereinafter, operations of the above components included in the image processing apparatus 1A will be described in sequence.

The image processing apparatus 1A continuously captures two frames of image while changing an exposure setting of the image sensor 10. Herein, it is assumed that a short-exposure photographing is first performed, and then, a long-exposure photographing is performed. However, the short-exposure photographing may be performed after the long-exposure photographing.

A short-exposure image and a long-exposure image captured in the above-described manner are paired and written to the frame memory 20A. The capturing of the short-exposure image and the long-exposure image and the writing of the short-exposure image and the long-exposure image to the frame memory 20A are continuously performed.

Figure 2:
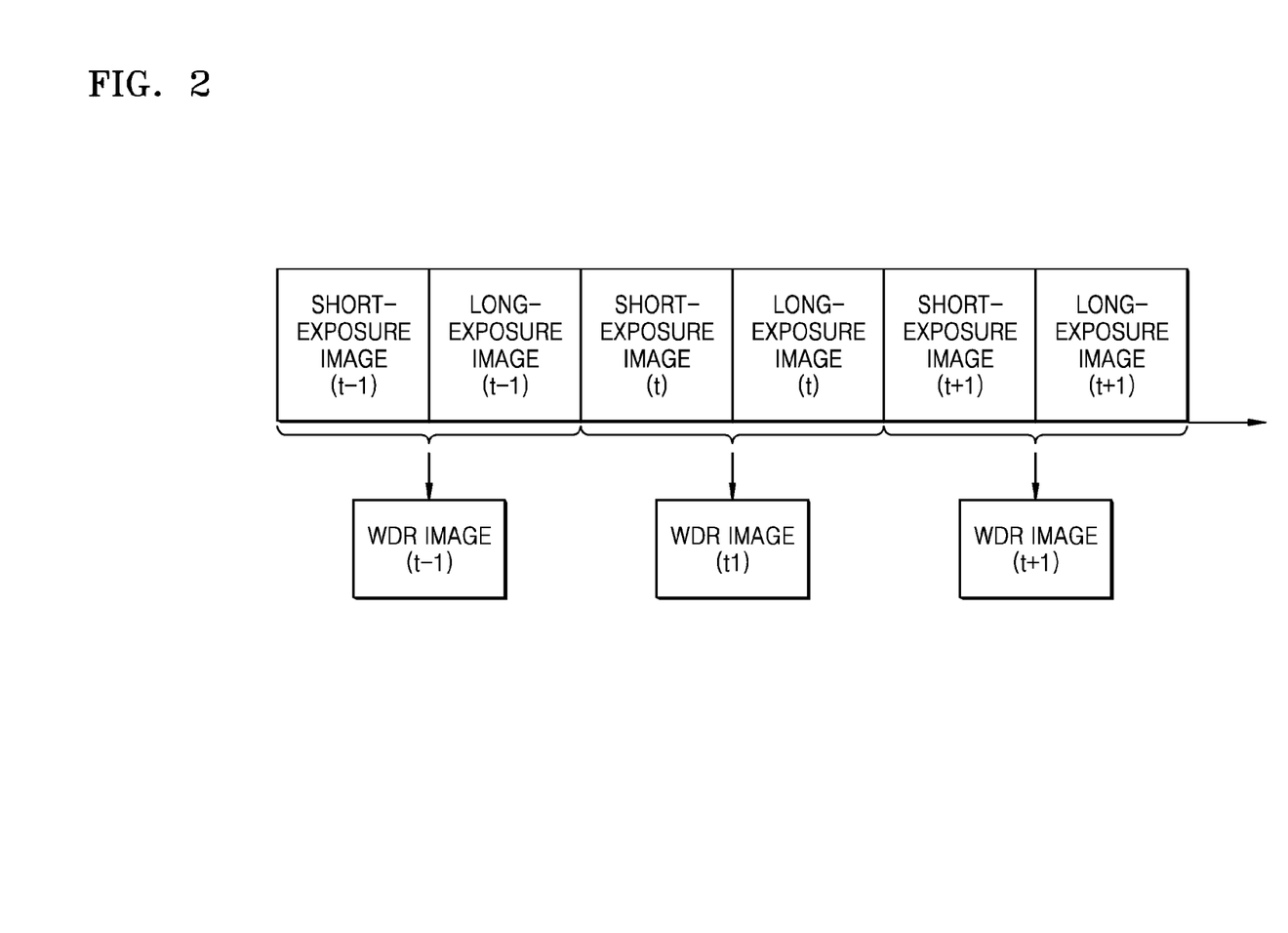
FIG. 2 is a diagram of a case where a pair of a long-exposure image and a short-exposure image are continuously captured, according to an exemplary embodiment.

FIG. 2 is a diagram of a case where a pair of a short-exposure image and a long-exposure image are continuously captured. Referring to FIG. 2, a short-exposure image (t−1), a long-exposure image (t−1), a short-exposure image (t), a long-exposure image (t), a short-exposure image (t+1), and a long-exposure image (t+1) are captured with respect to time. In FIG. 2, a capturing time of each image is indicated within parentheses. Hereinafter, similarly, the capturing time of each image may be indicated within parentheses.

In the present exemplary embodiment, at least the short-exposure image of the current time and the long-exposure image of the current time are left in the frame memory 20A. Therefore, the capturing interval of the short-exposure image and the long-exposure image is not particularly limited thereto. In addition, the short-exposure image and the long-exposure image may be written to the frame memory 20A at a period of each frame or may be written to the frame memory 20A at a period of a plurality of frames.

More specifically, as illustrated in FIG. 1, if there is a region to which a pair of a short-exposure image and a long-exposure image are written, the image processing apparatus 1A may continuously write the pair of a short-exposure image and a long-exposure image to the corresponding regions. For example, the short-exposure image (t−1) and the long-exposure image (t−1) written to the frame memory 20A may be overwritten by the short-exposure image (t) and the long-exposure image (t).

In addition, in the example illustrated in FIG. 1, the image processing apparatus 1A includes a common system for outputting a short-exposure image and a long-exposure image, and the image sensor 10 outputs the long short-exposure image and the long-exposure image in a time division manner, but the short-exposure image and the long-exposure image may be output at the same time. In this case, the image processing apparatus 1A may have two systems, that is, a system for outputting the short-exposure image from the image sensor 10 and a system for outputting the long-exposure image from the image sensor 10. The shutter time of each case is determined by a dynamic range of a subject or a specification of the image sensor 10.

In the exemplary embodiment, the terms "short-exposure image" and "long-exposure image" used herein are not limited to absolute exposure times of two captured images. Therefore, when two images having different exposure times are captured, the image having a relatively shorter exposure time corresponds to the short-exposure image, and the image having a relatively longer exposure time corresponds to the long-exposure image.

The image sensor 10 is configured to image external light on a light-receiving surface of an imaging element and forms an electric signal by photoelectrically converting the imaged light into an amount of charges. A type of the image sensor 10 is not particularly limited and may be a charge-coupled device (CCD) image sensor or a complementary metal-oxide semiconductor (CMOS) image sensor.

The use-image selector 30 detects a saturation state and a motion of each of the short-exposure image and the long-exposure image read from the frame memory 20A, and generates use-image selection information for selecting one of the short-exposure image and the long-exposure image as a use image. Various algorithms may be used for selecting one of the short-exposure image and the long-exposure image.

For example, since it is highly likely that a saturated region a long-exposure image will not be saturated in a short-exposure image, the short-exposure image may be selected as the use image of the corresponding region. However, using only this processing for a region with a large motion may cause an artifact. That is, a contour of this region may be doubled. Therefore, processing for detecting the large motion and reducing artifacts may be performed. The algorithm for selecting one of the short-exposure image and the long-exposure image, including the above-described processing, is not particularly limited.

In addition, as described above, the use-image selection information may be a set of binary data indicating which one of the short-exposure image and the long-exposure image is selected and may be a set of mixture ratios at which the short-exposure image and the long-exposure image are mixed. For example, the use-image selector 30 may increase a portion of the short-exposure image if saturation of the long-exposure image increases. In addition, the use-image selector 30 may increase a portion of the short-exposure image as the motion of the short-exposure image or the long-exposure image increases. An algorithm for calculating the mixture ratio of the short-exposure image and the long-exposure image is also not particularly limited thereto.

The motion detector 40 detects motion and generates motion detection information. A motion detection method is not particularly limited. When motion is detected from the short-exposure image and the long-exposure image, normalization may be performed by multiplying an exposure ratio by a gain of one of the two images, and then, a difference therebetween may be calculated.

In addition, a method of generating the motion detection information is not particularly limited. For example, the motion detector 40 may generate the motion detection information according to a relationship between motion detected from the short-exposure image and the long-exposure image and a threshold value.

Specifically, the motion detector 40 may detect a difference of pixel values or gradients of a corresponding region in the short-exposure image and the long-exposure image and detect a region, in which the difference is greater than the threshold value, as a motion region. It is obvious that the motion detector 40 may detect a region, in which the difference is less than the threshold value, as a non-motion region. A region, in which the difference is equal to the threshold value, may be detected as the motion region or the non-motion region. The motion detector 40 may generate such a detection result as the motion detection information.

The average processor 50 acquires averaged use-image selection information by averaging previous use-image selection information and current use-image selection information. The averaging performed by the average processor 50 is not particularly limited as long as it is a type of addition average. An example of the configuration of the average processor 50 will be described below.

Figure 3:
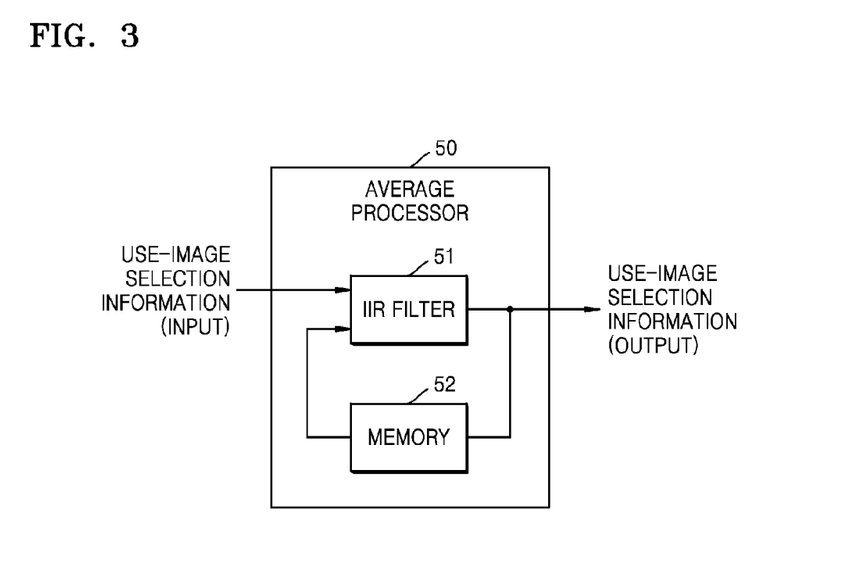
FIG. 3 is a block diagram illustrating a configuration of an average processor, according to an exemplary embodiment.

FIG. 3 is a block diagram illustrating an example of the configuration of the average processor 50. As illustrated in FIG. 3, the average processor 50 may include an infinite impulse response (IIR) filter 51 and a previous use-image selection information memory 52.

For example, the IIR filter 51 performs addition averaging on a current use-image selection information input by the use-image selector 30 and previous use-image selection information read from the previous use-image selection information memory 52 by using the following Equation 1:

$$Out = COEF \times Sprv + (1.0 - COEF) \times Scur \qquad (1)$$

In Equation 1 above, Out represents the use-image selection information output from the IIR filter 51 to a rear stage, Sprv represents the previous use-image selection information, Scur represents the current use-image selection information, and COEF represents a mixture coefficient. The mixture coefficient may be previously set or may be set by a user. The use-image selection information output from the IIR filter 51 to the rear stage is also written to the memory 52 of the previous use-image selection image and is used for next averaging by the IIR filter 51.

In addition, FIG. 3 illustrates an example in which the IIR filter 51 is used as the configuration for averaging the previous use-image selection information and the current use-image selection information. However, the averaging configuration is not limited to the IIR filter 51. For example, instead of the IIR filter 51, a finite impulse response (FIR) filter may be used, or other filter may be used.

The update processor 60 updates the use-image selection information averaged by the average processor 50, based on the motion detection information generated by the motion detector 40. Specifically, the update processor 60 updates the averaged use-image selection information with respect to the motion detection information, so that the short-exposure image is selected as the use image in the motion region. In this manner, it is possible to reduce the artifact causing the contour of the synthesized image to be doubled. On the other hand, the update processor 60 is configured such that the use-image selection information averaged by the average processor 50 is not updated in a non-motion region, with respect to the motion detection information.

The WDR synthesizer 70 generates a WDR-synthesized image by synthesizing the short-exposure image and the long-exposure image according to the use-image selection information averaged by the average processor 50. Specifically, the WDR synthesizer 70 generates a synthesized image by using a short-exposure image in a short-exposure image use region and using a long-exposure image in a long-exposure image use region, based on the averaged use-image selection information.

The synthesizing method performed by the WDR synthesizer 70 is not particularly limited.

For example, "0" is a value indicating that the long-exposure image is selected, and "1" is a value indicating that the short-exposure image is selected.

The WDR synthesizer 70 may calculate α×(pixel value of short-exposure image)+(1−α)×(pixel value of long-exposure image) (where α is a mixture ratio constituting the use-image selection information) with respect to a corresponding pixel in the long-exposure image and the short-exposure image and output the calculation result as a post-synthesis image (WDR image).

In this manner, in the first exemplary embodiment, when the short-exposure image and the long-exposure image are selected for use for synthesis, the use-image selection information averaged by the average processor 50 is referenced instead of the use-image selection information itself generated by the use-image selector 30. Therefore, it is possible to suppress the selected images from being frequently changed due to slight vibration.

In addition, as described above, the WDR synthesizer 70 may directly reference the averaged use-image selection information output from the average processor 50 and may reference the use-image selection information updated by the update processor 60. That is, the WDR synthesizer 70 may generate the synthesized image by synthesizing the long-exposure image and the short-exposure image according to the use-image selection information updated by the update processor 60. According to the above configuration, since the motion (for example, large vibration or moving object) detected by the motion detector 40 is reflected in the synthesis processing, the artifact caused by the synthesis may be reduced.

The gray scale compression processor 80 performs compression processing for setting a bit range of an image signal of a wide dynamic range to a predetermined bit range with respect to the WDR image generated by the WDR synthesizer 70. As the compression processing, a tone mapping based on a look-up table (LUT) may be used, but any method may be used.

The rear stage of the gray scale compression processor 80 is connected to an image processing engine (now shown) that generates an RGB plane from a Bayer pattern. The image processing engine may include a demosaicing processor, a contour enhancement processor, and a color management processor. Therefore, an amount of data of a signal output from the gray scale compression processor 80 may be adjusted to be suitable for a data size (for example, about 12 bits) input to the image processing engine. Since reduction in a data size changes an image to a dark image, a high-brightness side may be compressed to an extent that the WDR image is approximated to a human's visual characteristic.

An example of capturing and synthesizing two type of image (short-exposure image and long-exposure image) having different amounts of exposure has been described above. However, the type of image used in the image synthesis according to the inventive concept is not particularly limited. For example, three types of image having different amounts of exposure may be captured and synthesized to generate a WDR image.

More specifically, for the case of using a short-exposure image, a mid-exposure image, and a long-exposure image, the motion detector 40 may include two motion detectors that detect a motion from the short-exposure image and the mid-exposure image, and a motion from the mid-exposure image and the long-exposure image, respectively. According to an exemplary embodiment, the motion detector 40, as a single unit, may perform the foregoing two different motion detecting functions. Also, the motion detector 40 may use only one of the three images to detect motion information. In addition, the frame memory 20A may have a region for writing the mid-exposure image. A format of the use-image selection information may be a format for selecting a use image from three types of image, that is, the short-exposure image, the mid-exposure image, and the long-exposure image.

Next, effects of the first exemplary embodiment will be described below.

Figure 4:
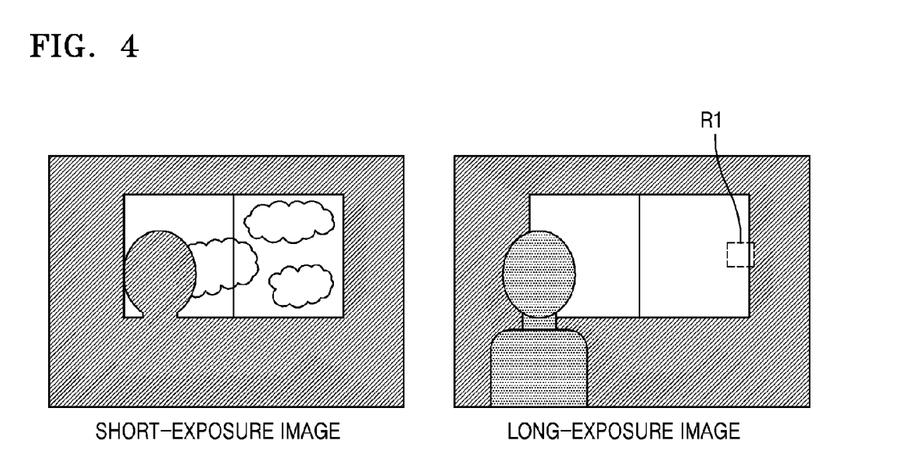
FIGS. 4, 5, 6A, 6B, and 6C are diagrams for explaining examples of effects of the first exemplary embodiment.
Figure 5:
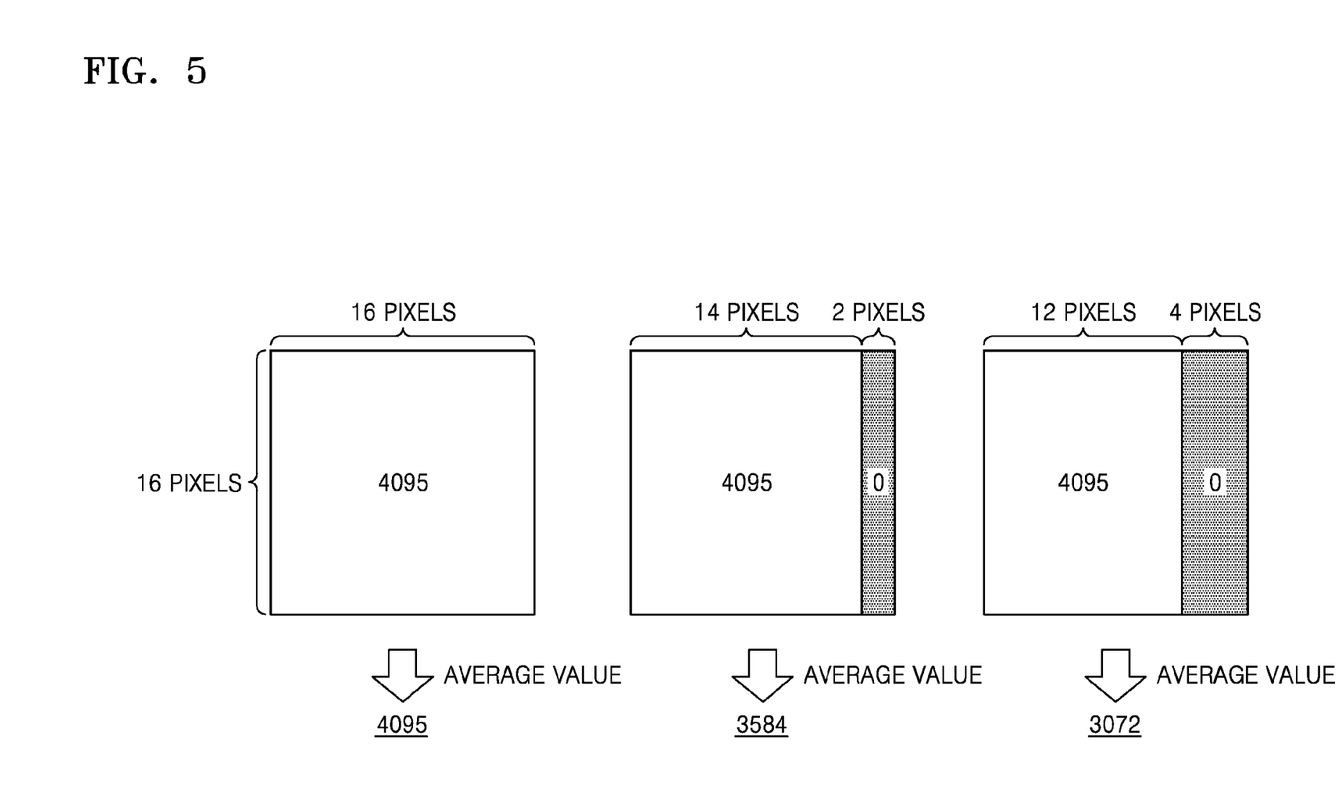
Figure 6A:
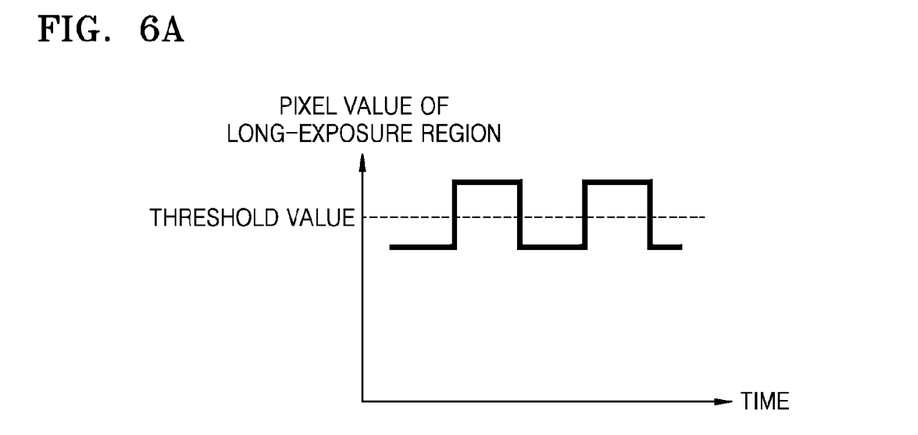
Figure 6B:
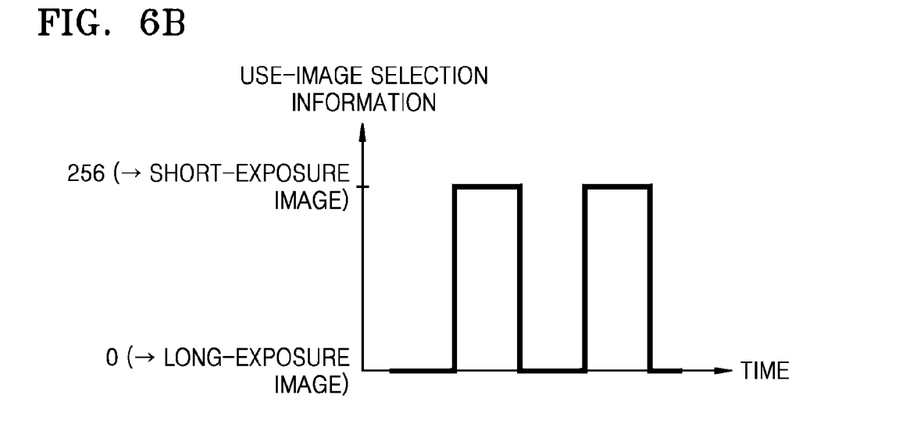
Figure 6C:
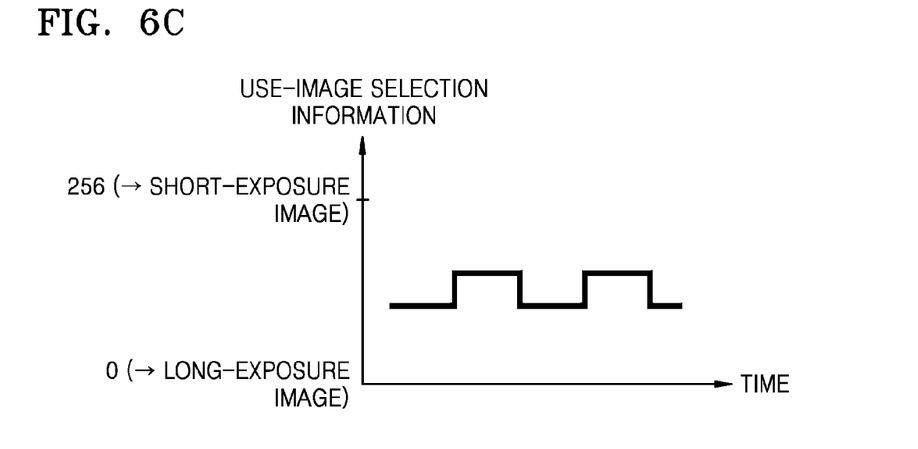

FIGS. 4 to 6 are diagrams for explaining the effects of the firs exemplary embodiment.

Referring to FIG. 4, a short-exposure image and a long-exposure image captured by a camera are illustrated. In each image, a scene where a bright outdoors is captured from indoors is shown. In the long-exposure image, a window region is fully saturated and thus the indoors is darkly captured. In the short-exposure image, a cloud outdoors is captured in the window region, but the indoors is almost coal-black. In such a scene, it is considered as a case of selecting a use image based on the logic "use a short-exposure image when a pixel value of a long-exposure image is equal to or greater than a threshold value".

Based on an evaluation region R1 surrounded by a dashed line in the long-exposure image, a case of calculating an average value of the evaluation region R1 in the long-exposure image is illustrated in FIG. 5. Since a 12-bit signal is saturated in the window region, a pixel value of the window region is set to 4,095. A pixel value of the darkly captured indoor is set to 0 for simplicity. A size of the evaluation region R1 is 16 pixels×16 pixels. If the camera vibrates horizontally, pixels where the indoors is dark in the evaluation region R1 repeat invasion and escape.

For example, if two dark pixel columns of the indoors area invade the evaluation region R1, an average pixel value of the long-exposure image is 3,584, which is significantly lowered. When four pixel columns invade, an average value of the long-exposure image is 3,072, which is a much smaller value than the above case. That is, if the camera vibrates at an amplitude of four pixel columns, an average pixel value of the long-exposure image in a corresponding region changes between 4,095 and 3,072.

As such, when evaluating a pixel value of a long-exposure image around a region where a high-contrast edge exists, an evaluation value may greatly fluctuate due to slight vibration of several pixels and thus may fluctuate around the threshold value for determining image selection. FIG. 6A illustrates a case where the pixel value of the long-exposure image fluctuates around the threshold value. If the use image is selected according to the evaluation value, a change to select the short-exposure image or the long-exposure image with respect to the corresponding region occurs with respect to time.

FIG. 6B illustrates a time-direction motion of the use-image selection information when the use of the short-exposure image is defined as 256 and the use of the long-exposure image is defined as 0. According to the first exemplary embodiment, previous use-image selection information and current use-image selection information are averaged.

FIG. 6C is a diagram illustrating a time-direction motion of the averaged use-image selection information when the use-image selection information is averaged. In this case, temporal change of the use-image selection information is suppressed. If the use-image selection information is averaged, a mixture ratio of the short-exposure image and the long-exposure image is set within a small range. Thus, a difference of image quality between the short-exposure image and the long-exposure image is hardly detected.

However, if the use-image selection information is addition-averaged with respect to time, synthesis processing of images of a moving object becomes a problem. There is a technology that selects a short-exposure image in a motion region so as to reduce an artifact occurring in synthesizing images of a moving object. If use-image selection information selecting the short-exposure image in the motion region is addition-averaged with respect to time, a long-exposure image is mixed in the motion region, causing the occurrence of a synthesis artifact. Regarding this problem, in the first exemplary embodiment, it is possible to reduce the synthesis artifact of the moving object by integrating the use-image selection information with motion information after performing addition averaging on the use-image selection information with respect to time.

When an entire screen moves in a wide range appearing as a panning operation and a tilting operation, the entire screen is detected as motion. Therefore, in this case, synthesis may be performed while WDR synthesis processing is not performed or a position is adjusted through coordinate conversion. According to the first exemplary embodiment, it is possible to prevent the appearance of flicker caused by the temporal change in the selection of the short-exposure image and the long-exposure image.

However, slight vibration of several pixels, for example, two pixel columns, are not detected as motion and becomes the cause of temporally changing the use-image selection information in the high-contrast region. Therefore, it is likely that flicker will occur in a synthesized image. In particular, as the number of pixels increases, slight vibration also may be captured and developed. In the first exemplary embodiment, it is possible to reduce influence of slight vibration, which is hardly affected by such motion detection, on the WDR-synthesized image.

Second Embodiment

Next, a second exemplary embodiment will be described below. In the first embodiment, the previous use-image selection image needs to be stored and retained in the memory, as compared to the related art, and increase of a memory area or increase of an amount of data transmission may be an obstacle in view of hardware. For example, in the case of using the use-image selection information format illustrated in FIG. 6B, information corresponding to "9 bits×image size" is stored and retained. In the second exemplary embodiment, a configuration capable of exhibiting the same effects as those of the first exemplary embodiment and suppressing the increase of the amount of data transmission will be described below.

Figure 7:
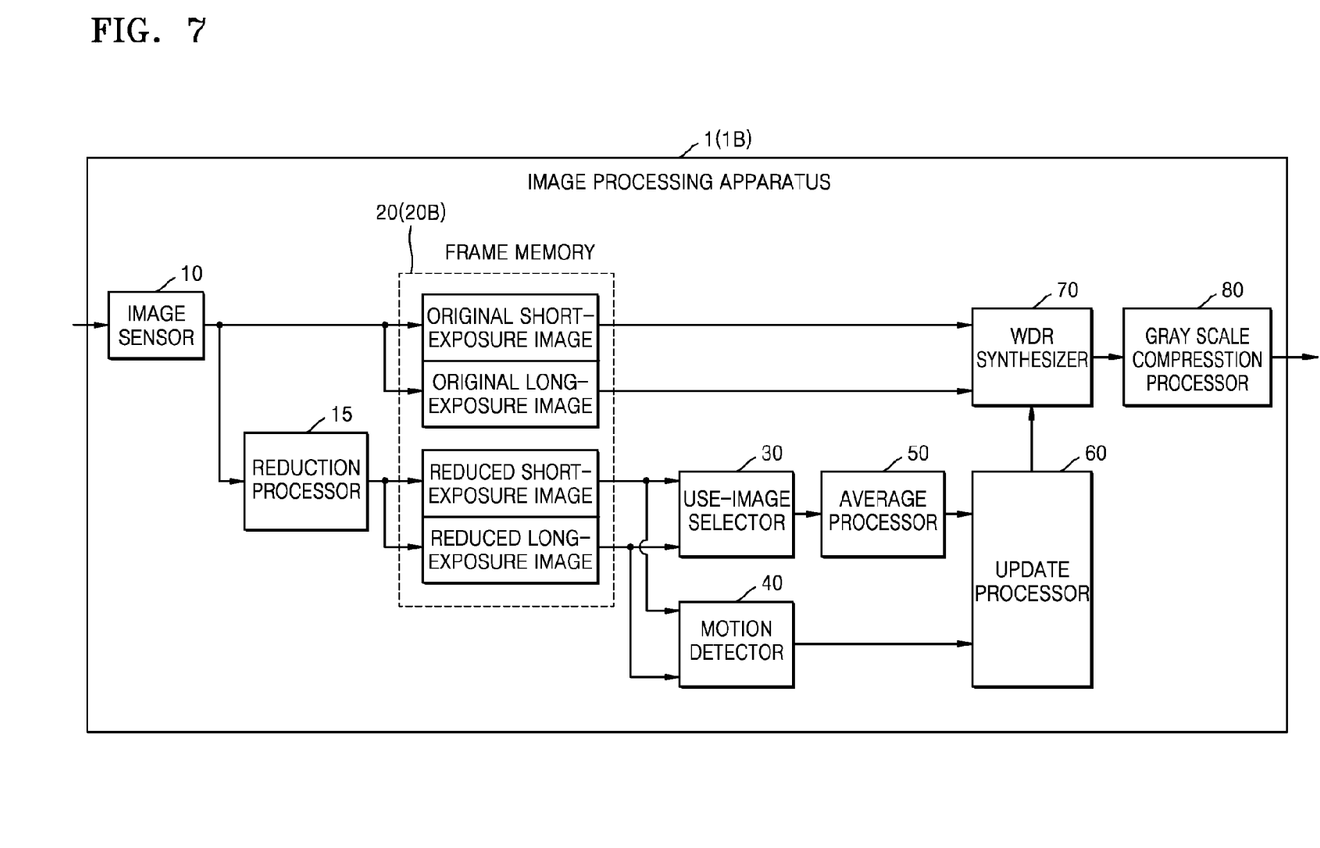
FIG. 7 is a diagram illustrating a configuration and operation of an image processing apparatus, according to a second exemplary embodiment.

FIG. 7 is a diagram illustrating a configuration and operation of an image processing apparatus 1B according to the second exemplary embodiment. As illustrated in FIG. 7, the image processing apparatus 1B according to the second exemplary embodiment further includes a reduction processor 15 at a rear stage of an image sensor 11, as compared to the image processing apparatus 1A according to the first exemplary embodiment. Hereinafter, the reduction processor 15 will be described in detail.

The reduction processor 15 reduces a long-exposure image and a short-exposure image. A method of generating a reduced image is not particularly limited. A set of average values of each rectangular region (e.g., macroblock) may be generated as a reduced image. Referring to FIG. 7, the respectively reduced images are written to a frame memory 20B as a reduced long-exposure image and a reduced short-exposure image.

A use-image selector 30 may generate use-image selection information according to the reduced short-exposure image and the reduced long-exposure image. According to the above configuration, the size of the previous use-image selection information generated by the use-image selector 30 is reduced, as compared to the case of generating the use-image selection information according to an original short-exposure image and an original long-exposure image. Therefore, it is possible to suppress increase of the size of the memory 52 in FIG. 3 which stores the previous use-image selection information or increase of the amount of data transmission.

A motion detector 40 may generate motion detection information according to the reduced short-exposure image and the reduced long-exposure image. According to the above configuration, it is possible to suppress increase of the amount of data transmission.

It is obvious that the motion detector 40 may generate the motion detection information according to the original short-exposure image and the original long-exposure image. In addition, it is obvious that the short-exposure image and the long-exposure image used by the WDR synthesizer 70 may not be reduced. Referring to FIG. 7, the non-reduced short-exposure image and the non-reduced long-exposure image are written to the frame memory 20B as the original short-exposure image and the original long-exposure image.

Next, effects of the second exemplary embodiment will be described in details. For example, when horizontal and vertical reduction ratios are set to 1/10, an amount of data of the reduced image is 1/100 of the amount of data of the original image. Therefore, the amount of data of the amount corresponding to two reduced images (long-exposure image and short-exposure image) is merely 1/50 (2%) of the amount of data of the original image, and the amount of data of the previous use-image selection information is 1/100 of the amount of data of the use-image selection information generated from the original image. Therefore, as compared to the related art, the second exemplary embodiment is capable of remarkably suppressing increase of the amount of data.

In the case of using the reduced image in the motion detection, it is considered that a space resolution of the motion detection information is 1/100. However, if the motion detection is performed using the reduced image, noise is reduced in the reduction processing. Thus, the motion detection may be performed using a high-quality image. In addition, since the motion detection performed with reference to the reduced image is equivalent to the motion detection performed with reference to a predetermined region, it is possible to obtain a spatially robust detection result. In addition, even when the spatial resolution of the motion detection information is slightly lowered, it is possible to obtain motion detection information that is accurate enough to perform motion adaptation processing on a motion target having a predetermined size. Therefore, it is considered that there is almost no actual disadvantage in the present configuration that uses the reduced images.

The first exemplary embodiment and the second exemplary embodiment have been described above. According to the first exemplary embodiment, the image processing apparatus 1A includes: the use-image selector 30 that selects a long-exposure image or a short-exposure image with respect to each region and generates use-image selection information; the average processor 50 that acquires averaged use-image selection information by averaging previous use-image selection information and current use-image selection information; and the WDR synthesizer 70 that generates a synthesized image by synthesizing the long-exposure image and the short-exposure image according to the averaged use-image selection information.

According to the above configuration, when the short-exposure image and the long-exposure image are selected for use in the synthesis, the use-image selection information averaged by the average processor 50 is referenced instead of the use-image selection information itself generated by the use-image selector 30. Therefore, it is possible to suppress the selected images from being frequently changed due to slight vibration.

In addition, according to the second exemplary embodiment, the image processing apparatus 1B includes: the reduction processor 15 that obtains a reduced long-exposure image and a reduced short-exposure image by respectively reducing a long-exposure image and a short-exposure image, and the use-image selector 30 generates the use-image selection information according to the reduced long-exposure image and the reduced short-exposure image.

According to the above configuration, the use-image selection information is generated according to the reduced short-exposure image and the reduced long-exposure image, and the generated use-image selection information is transmitted to the average processor 50. In addition, the use-image selection information averaged by the average processor 50 is written to a memory as the previous use-image selection information. Therefore, it is possible to suppress increase of the memory area or increase of the amount of data transmission.

In the network camera field requiring a higher resolution than ever, the technology for visually stabilizing a synthesized image is expected to become more important. The exemplary embodiments are directed to reduce the occurrence of flicker occurring in the synthesized image due to slight vibration. The exemplary embodiments also reduce a synthesis artifact of an image of a moving object or realize an image processing apparatus in a realistic circuit size, while stabilizing the quality of the synthesized image.

It should be understood that the exemplary embodiments described above should be considered in a descriptive sense only and not for purposes of limitation. Descriptions of features or aspects of the above embodiments should typically be considered as available for other embodiments.

According to an exemplary embodiment, there is provided a method of image processing which may include operations in which various functions of the above-described image processing apparatus are performed. Since descriptions about these operations are redundant, they are omitted herein. However, according to another exemplary embodiment, these operations may be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The transmission medium can include carrier waves transmitted through the Internet or various types of communication channel. The computer readable recording medium can also be distributed over network coupled computer systems so that the computer readable code is stored and executed in a distributed fashion.

At least one of the components, elements or units represented by a block as illustrated in FIGS. 1, 3 and 7 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

While a few exemplary embodiments have been described with reference to the drawings, it will be understood by those of ordinary skill in the art that various changes in form and details may be made thereto without departing from the spirit and scope of the inventive concept as defined by the following claims.

What is claimed is:

1. An image processing apparatus comprising:
    a use-image selector configured to generate use-image selection information for selecting one image, from a plurality of images of a subject which are captured for a plurality of exposure time periods, to be used for each region of a synthesized image;
    an average processor configured to acquire averaged use-image selection information by averaging previous use-image selection information and current use-image selection information; and
    a synthesizer configured to generate the synthesized image by synthesizing at least two images, among the plurality of images, to constitute the each region according to the averaged use-image selection information.

2. The image processing apparatus of claim 1, further comprising:
    a motion detector configured to detect motion information about the subject; and
    an update processor configured to update the averaged use-image selection information according to the motion detection information,
    wherein the synthesizer is configured to generate the synthesized image by synthesizing the at least two images according to the updated use-image selection information.

3. The image processing apparatus of claim 2, wherein the motion detector is configured to detect the motion information using the at least two images.

4. The image processing apparatus of claim 2, wherein the motion detector is configured to detect the motion information using only one image selected from the at least two images.

5. The image processing apparatus of claim 2, further comprising a reduction processor configured to obtain reduced images by respectively reducing the plurality of images,
    wherein the use-image selector is configured to generate the use-image selection information according to the reduced images.

6. The image processing apparatus of claim 5, wherein the reduction processor is configured to reduce the plurality of images by dividing each of the plurality of images into plurality of predetermined-size blocks, and averaging pixel values of each of the blocks.

7. The image processing apparatus of claim 5, wherein the motion detector is configured to detect the motion information from the reduced images.

8. The image processing apparatus of claim 2, wherein the update processor is configured to update the averaged use-image selection information so that an image, which is captured for the shortest exposure time period among the plurality of images, is used in a motion region, corresponding to the motion information, of the synthesized image.

9. The image processing apparatus of claim 1, wherein the previous use-image selection information comprises a mixture ratio of at least two previous images for each region in a previously generated synthesized image, and
    wherein the current use-image selection information comprises a mixture ratio of the at least two images for the each region in the synthesized image.

10. The image processing apparatus of claim 9, further comprising:
    a motion detector configured to detect motion information about the subject; and
    an update processor configured to update the averaged use-image selection information according to the motion detection information,
    wherein the synthesizer is configured to generate the synthesized image by synthesizing the at least two images according to the updated use-image selection information.

11. An image processing method comprising:
    generating use-image selection information for selecting one image, from a plurality of images of a subject which are captured for a plurality of exposure time periods, to be used for each region of a synthesized image;

acquiring averaged use-image selection information by averaging previous use-image selection information and current use-image selection information; and generating a synthesized image by synthesizing at least two images, among the plurality of images, to constitute the each region according to the averaged use-image selection information.

12. The image processing method of claim 11, further comprising:

detecting motion information about the subject; and updating the averaged use-image selection information according to the motion detection information, wherein the synthesized image is generated by synthesizing the at least two images according to the updated use-image selection information.

13. The image processing method of claim 12, wherein the motion information is detected using the at least two images.

14. The image processing method of claim 12, wherein the motion information is detected from only one image selected from the at least two images.

15. The image processing method of claim 12, further comprising obtaining reduced images by respectively reducing the plurality of images, wherein the use-image selection information is generated according to the reduced images.

16. The image processing method of claim 15, wherein the reducing the plurality of images is performed by dividing each of the plurality of images into plurality of predetermined-size blocks and averaging pixel values of each of the blocks.

17. The image processing method of claim 15, wherein the motion information is detected from the reduced images.

18. The image processing method of claim 12, wherein the averaged use-image selection information is updated so that an image, which is captured for the shortest exposure time period among the plurality of images, is used in a motion region, corresponding to the motion information, of the synthesized image.

19. The image processing method of claim 11, wherein the previous use-image selection information comprises a mixture ratio of at least two previous images for each region in a previously generated synthesized image, and wherein the current use-image selection information comprises a mixture ratio of the at least two images for the each region in the synthesized image.

20. The image processing method of claim 19, further comprising:

detecting motion information about the subject; and updating the averaged use-image selection information according to the motion detection information, wherein the synthesized image is generated by synthesizing the at least two images according to the updated use-image selection information.

* * * * *